(12) United States Patent
Vail et al.

(10) Patent No.: US 7,703,123 B2
(45) Date of Patent: Apr. 20, 2010

(54) METHOD AND SYSTEM FOR SECURITY CONTROL IN AN ORGANIZATION

(75) Inventors: Robert R. Vail, North Tonawanda, NY (US); Saleem Siddiqui, Sterling Heights, MI (US); Rachel L. Snyder, Canton, MI (US); Gary L. Wren, Bedford, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1654 days.

(21) Appl. No.: 10/914,620

(22) Filed: Aug. 9, 2004

(65) Prior Publication Data

US 2006/0031932 A1   Feb. 9, 2006

(51) Int. Cl.
G06F 12/14 (2006.01)

(52) U.S. Cl. .............................. 726/1; 726/22; 726/25; 713/100; 713/155; 713/168; 713/188; 709/220; 709/221; 709/223; 709/225; 709/227; 709/230; 709/232; 707/2; 707/10; 705/64; 705/76

(58) Field of Classification Search ...................... 726/1
See application file for complete search history.

(56) References Cited

U.S. PATENT DOCUMENTS

| | | | | |
|---|---|---|---|---|
| 6,158,007 A | * | 12/2000 | Moreh et al. | 726/1 |
| 7,006,992 B1 | * | 2/2006 | Packwood | 705/38 |
| 7,260,830 B2 | * | 8/2007 | Sugimoto | 726/1 |
| 7,472,422 B1 | * | 12/2008 | Agbabian | 726/25 |
| 2001/0049793 A1 | * | 12/2001 | Sugimoto | 713/200 |
| 2002/0129221 A1 | * | 9/2002 | Borgia et al. | 712/1 |
| 2003/0065942 A1 | * | 4/2003 | Lineman et al. | 713/201 |
| 2003/0110397 A1 | * | 6/2003 | Supramaniam et al. | 713/201 |
| 2003/0115322 A1 | * | 6/2003 | Moriconi et al. | 709/224 |
| 2005/0257244 A1 | * | 11/2005 | Joly et al. | 726/1 |
| 2006/0010496 A1 | * | 1/2006 | Parapadakis | 726/25 |

OTHER PUBLICATIONS

Weiss, J., 'Control System Cyber Vulnerabilities and Potential Mitigation of Risk for Utilities ', Juniper Networks, Inc., 2009, entire document, http://www.juniper.net/us/en/local/pdf/whitepapers/2000267-en.pdf.*

* cited by examiner

Primary Examiner—Edan Orgad
Assistant Examiner—Ronald Baum

(57) ABSTRACT

According to one embodiment of the invention, a method for managing security for an organization is provided. The method includes receiving a plurality of requests from a plurality of parties. Each request is a request for permission to implement a deviation from a security rule. Each request includes a statement describing a benefit associated with the deviation. The method also includes determining a risk associated with the deviation. The method also includes deciding whether to approve each request based on the determined risk and the statement. The method also includes storing the requests and a status of each request. The status indicates whether the request is approved. The stored requests includes at least one approved request. The method also includes deciding, after a predetermined time period, whether to continue an approval of the approved request.

33 Claims, 4 Drawing Sheets

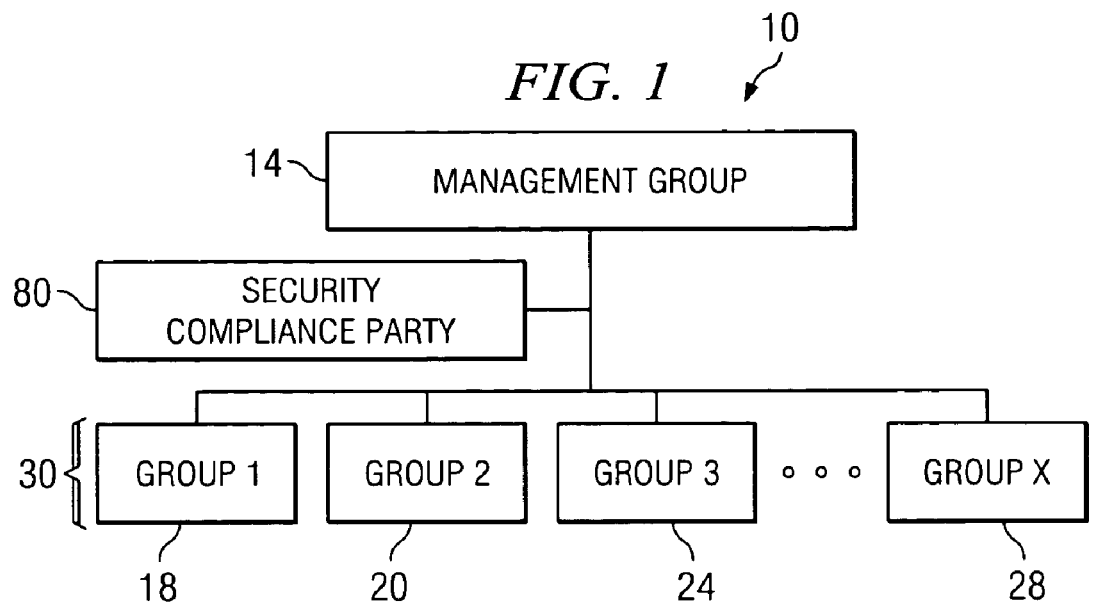
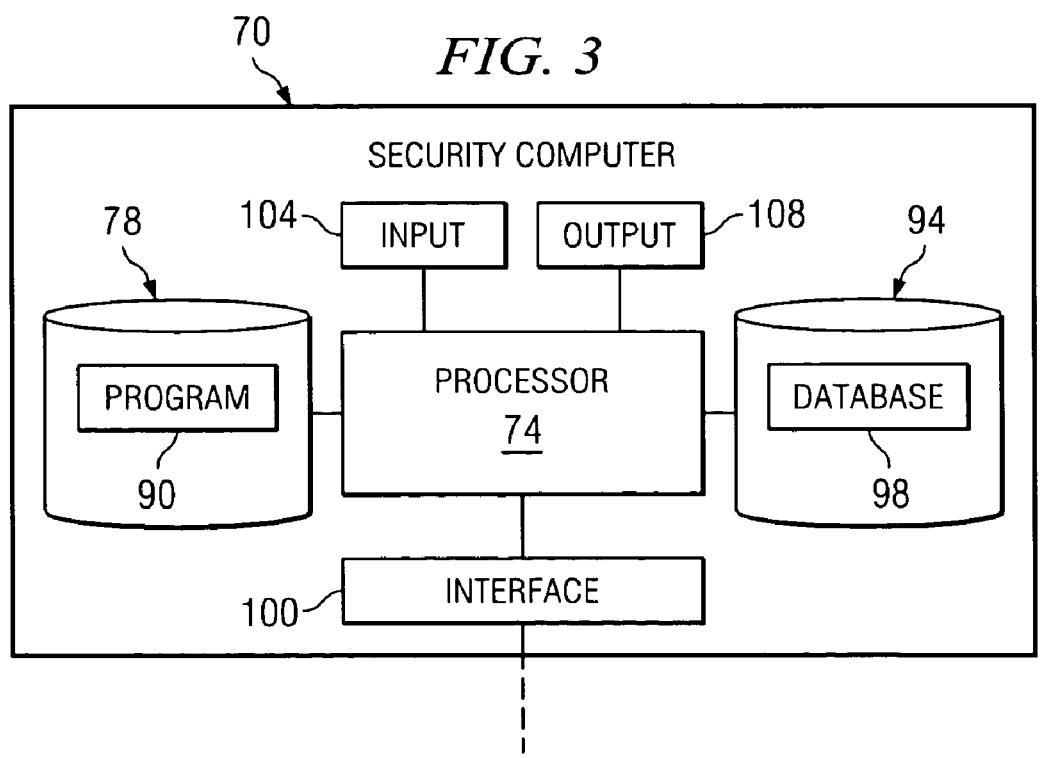

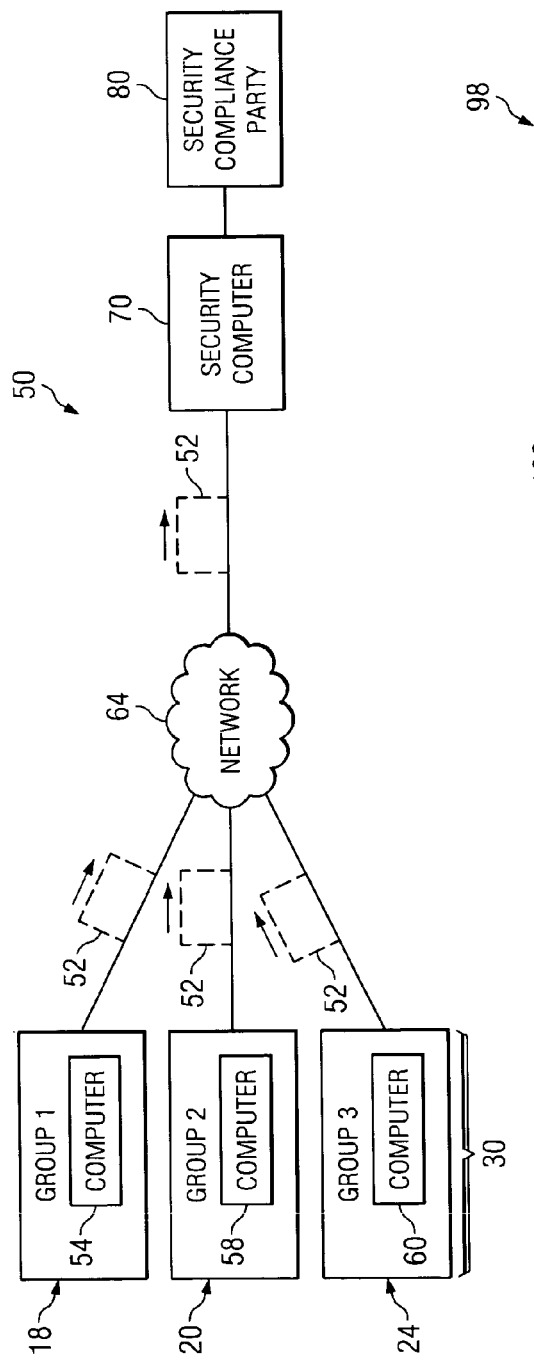

METHOD AND SYSTEM FOR SECURITY CONTROL IN AN ORGANIZATION

TECHNICAL FIELD OF THE INVENTION

This invention relates generally to security and more particularly to a method and system for security control in an organization.

BACKGROUND OF THE INVENTION

An organization may adopt different measures as part of its security program to ensure that its tangible and intangible properties are protected. For example, a company may use a firewall for network protection, security guards for protection of physical locations, and access cards to control access to sensitive areas. To control and standardize many aspects of an organization's security, a security policy is generally promulgated within the organization with the expectation that the policy will be properly implemented by those within the organization.

As the organization expands and branches out to diverse and sometimes unrelated fields, the organization's security policy may become increasingly difficult to implement. Further, because of the diverse and often competing needs of different parties in an organization, it may be difficult to formulate a security policy that allows all parties within the organization to engage in their respective activities without unduly hindering some of the group from their activities or exposing some of the groups to an unacceptable level of security risk.

SUMMARY OF THE INVENTION

According to one embodiment of the invention, a method for managing security for an organization is provided. The method includes receiving a plurality of requests from a plurality of parties. Each request is a request for permission to implement a deviation from a security rule. Each request includes a statement describing a benefit associated with the deviation. The method also includes determining a risk associated with the deviation. The method also includes deciding whether to approve each request based on the determined risk and the statement. The method also includes storing the requests and a status of each request. The status indicates whether the request is approved. The stored requests includes at least one approved request. The method also includes deciding, after a predetermined time period, whether to continue an approval of the approved request.

Some embodiments of the invention provide numerous technical advantages. Other embodiments may realize some, none, or all of these advantages. For example, according to one embodiment, a security policy may be implemented in a way that meets the requirements of every group within an organization by receiving requests for deviation from security rules from different groups within an organization and making decisions regarding the received requests by a security party. In another embodiment, vulnerabilities to security threats may be identified by matching a characteristic of a security threat to an implemented deviance from a security rule. Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which:

FIG. 1 is an organizational block chart of an example organization that may benefit from the teachings of the present invention;

FIG. 2 is a schematic diagram illustrating one embodiment of a computer network that may be used to manage security within the organization shown in FIG. 1;

FIG. 3 is a schematic diagram illustrating one embodiment of a security computer shown in FIG. 2;

FIG. 4 is a schematic diagram illustrating one embodiment of a database shown in FIG. 3;

DETAILED DESCRIPTION OF EXAMPLE EMBODIMENTS OF THE INVENTION

Figure 5:
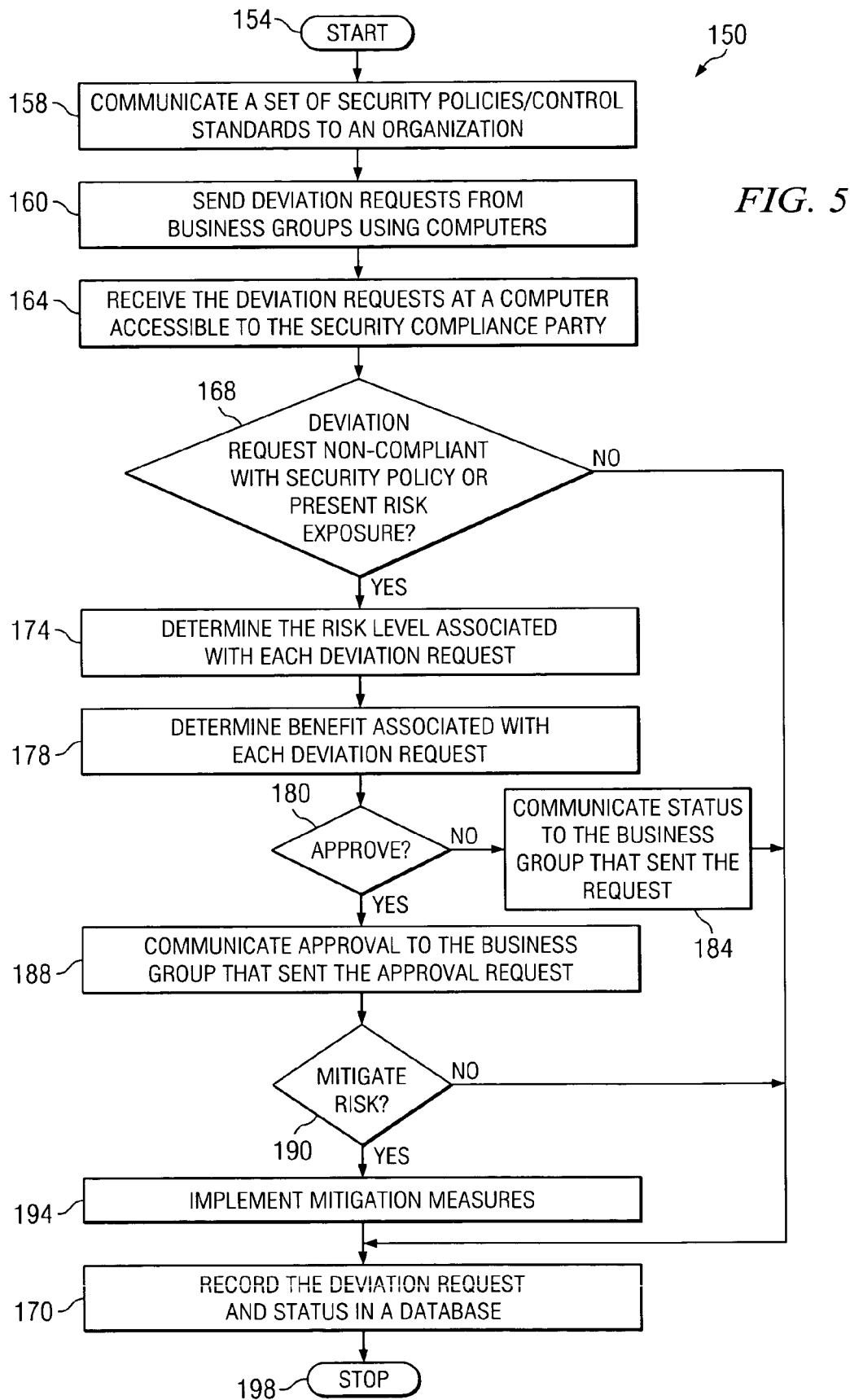
FIG. 5 is a flowchart illustrating one embodiment of a method for managing security in the organization shown in FIG. 1.

Embodiments of the invention are best understood by referring to FIGS. 1 through 6 of the drawings, like numerals being used for like and corresponding parts of the various drawings.

FIG. 1 is a block diagram illustrating one embodiment of an organization 10 that may benefit from the teachings of the present invention. Organization 10 includes a management party 14 and groups 18, 20, 24, and 28 that carry out their respective activities under the direction of management party 14. Groups 18, 20, 24, and 28 are jointly referred to as groups 30. Organization 10 may engage in one or more activities that may or may not be related. Examples of organization 10 include, but are not limited to, a for-profit business, a non-profit organization, an educational institution, and a governmental organization.

Management party 14 may be a board of directors, a chief executive officer, a chief operating officer, a president, a director, or any other party within organization 10 that has authority to control some aspect of groups 30. Each group 30 may be any entity of one or more persons within organization 10 that is under the control of management party 14. Each group 30 may engage in the same or different activities. For example, group 18 develops payroll software, group 20 develops network management software, group 24 provides healthcare management for patients and hospitals, and group 28 provides consulting and accounting services for businesses. In another example, group 18 is a human resources department, group 20 is a legal department, group 24 is an accounting department, and group 28 is a maintenance department. For illustrative purposes, groups 30 are referred to as business groups 30 of organization 10.

An organization generally establishes a security policy, security control standards, and implementation standards. Security policy provides a general guideline on what needs to be done to protect the organization's interests, such as tangible and intangible assets, from unauthorized access. Security control standards describe a set of general tasks that are required to be performed to implement the security policy. Implementation standards describe specific tasks that are required to be performed to implement the security control standards. For example, a security policy may state that access to a company's network should be granted only to authorized personnel, and control measures should be adopted to protect the network from unauthorized entry. One of the security control standards implementing this policy may require network passwords of each authorized person to be changed every six months to deter the theft of passwords.

One of the implementation standards implementing this security control standard may require that a reminder to change the password should be sent to each authorized user every six months and that a previously-used password of an authorized person cannot be used within a two-year period. The security policy, the security control standard, and the implementation standard are jointly referred to as security rules.

It is desirable for security rules of an organization to strike a balance between the freedom of conducting the organization's activities and the level of protection against security threats. On one extreme, having no security rules may reduce cost, down-time for employees, and increase efficiency for an organization, but may expose the organization to theft, computer hacking/computer viruses, and other types of security threats. On the other extreme, having security rules that are too restrictive may increase the cost in both money and time to a point where the organization can no longer engage in its activities at a required level of efficiency. As the organization gets larger and/or its activities become more diverse, establishing and implementing security rules that reach a compromise between protection and flexibility for the entire organization may become more difficult.

According to one embodiment of the invention, a system and a method for managing security in an organization is provided. In one embodiment, security rules may be implemented in a way that meets the reasonable needs of every group within an organization by receiving requests for deviation from a security rule from different groups within an organization and making decisions regarding the received requests by a security party. In another embodiment, vulnerabilities to security threats may be identified by matching a characteristic of a security threat to an implemented deviance from a security rule. Additional details of example embodiments of the invention are described below in greater detail in conjunction with parts of FIG. 1 and FIGS. 2-6.

Referring back to FIG. 1, a security compliance party 80 is provided for organization 10. Party 80 may be a person or a committee of persons having authority to make security decisions within organization 10. Party 80 may be a part of organization 10, or may be an outside entity that is contracted by organization 10 to perform security management for organization 10. In one embodiment, party 80 receives a plurality of deviation requests from business groups 30. Each request is a request for permission to implement a deviation from what is required by a security rule, such as a security control standard, that applies to organization 10.

After receiving the deviation requests, party 80 reviews each deviation request and decides to approve or deny the deviation request based on the benefits associated with the deviation request and the security risk associated with the deviation request. Party 80 may also identify mitigating measures that may be implemented to reduce the risk associated with the deviation and consider the mitigating measures in its decision to approve or deny the deviation request. In one embodiment, party 80 makes a decision on each deviation request and records the deviation and the decision on the request in a database. In one embodiment, security compliance party 80 is the only entity associated with organization 10 that is authorized by management party 14 to receive deviation requests and to decide matters associated with the deviation requests.

FIG. 2 is a schematic diagram illustrating one embodiment of a communication system 50 that may be used in organization 10 shown in FIG. 1 to communicate requests 52 to deviate from one or more security rules, such as security control standards. As shown in FIG. 2, security compliance party 80 is able to communicate with business groups 30 through a security computer 70 and a network 64. Business groups 18, 20, and 24 have access to computers 54, 58, and 60, respectively, and may use computers 54, 58, and 60 to send deviation requests 52. Each deviation request 52 identifies a particular security rule and a description of the proposed deviation from the identified security rule. In one embodiment, each request 52 also includes a statement describing at least one benefit and/or reasoning associated with the requested deviation.

In one embodiment, network 64 is the Internet, a wide area network ("WAN"), a local area network ("LAN"), or any other suitable network. In the Internet embodiment, network 64 transmits information in Internet protocol ("IP") packets. Network 64 may comprise any other suitable types of elements and links over which traffic may be otherwise suitably transmitted using other protocols and formats.

Security computer 70 is operable to receive deviation request 52 through network 64 and to present each deviation request 52 to party 80. In one embodiment, security computer 70 is operable to store deviation request 52 and the decision of party 80 corresponding to deviation request 52 in a database, and to search through the database using one or more criteria provided by party 80.

FIG. 3 is a schematic diagram illustrating one embodiment of security computer 70 shown in FIG. 2. As illustrated, computer 70 includes a processor 74, a memory 78 storing a security management program 90, and one or more data storage units 94 for storing a database 98. Computer 70 also includes an interface 100, such as a modem, that allows processor 74 to communicate with other computers, such as computers 54, 58, and 60 shown in FIG. 2. Computer 70 is coupled to an input unit 104 and an output unit 108. Examples of input unit 104 include, but are not limited to, a keyboard and a mouse. Examples of output unit 108 include, but are not limited to, a monitor and a printer.

Processor 74 is coupled to memory 78 and data storage unit 94. Processor 74 is operable to execute the logic of program 90 and to access data storage unit 94 to store or retrieve data associated with deviation requests 52. Examples of processor 74 include, but are not limited to, the PENTIUM series processors available from Intel Corporation.

Memory 78 and data storage unit 94 may comprise files, stats, or other suitable forms of data. Memory 78 and data storage unit 94 may be random-access memory, read-only memory, CD-ROM, removable memory devices, or any other suitable device that allows storage and/or retrieval of data. Memory 78 and data storage unit 94 may be interchangeable and may perform the same functions, in one embodiment.

Security management program 90 is a computer program that is operable to receive deviation requests 52, to present deviation requests 52 to party 80, and to store deviation requests 52 and corresponding status of deviation requests 52 in data storage unit 94. A status of deviation request 52 indicates whether party 80 has approved the deviation request 52. For example, if a particular deviation request 52 is approved by party 80, then the status of the deviation request 52 may be indicated as "active" in database 98. If the deviation request 52 is denied, then the status of the deviation request 52 is indicated as "closed" in database 98. If no decision has been made, then the status of the deviation request 52 is indicated as "open." Although "active," "closed," and "open" are used as examples to describe one embodiment of the invention, any suitable way of indicating different statuses may be used.

In one embodiment, program 90 is operable to search database 98 using one or more criteria provided by party 80 and to identify a deviation request stored in database 98 that matches the provided criteria. In one embodiment, program 90 is operable to periodically retrieve deviation request 52 that in "active" status and present the retrieved deviation request 52 to party 80 so that party 80 may decide whether to continue the approval of the retrieved deviation request 52. This periodic review may be more frequent if the risk level associated with deviation request 52 is higher. Security management program 90 may reside in any storage medium, such as memory 78 or data storage unit 94. Security management program 90 may be written in any suitable computer language, including C or C++.

FIG. 4 is a schematic diagram illustrating one embodiment of database 98 shown in FIG. 3. Database 98 comprises a plurality of rows 110, 114, 118, 120, 128, and 130. Columns 110-130 are jointly referred to as columns 132. Database 98 also includes rows 134, 138, and 140. Rows 134-140 are jointly referred to as rows 142. More or less columns 132 and more or less rows 142 may be used to form database 98. Column 110 lists a particular identifier for each deviation request 52. For example, as shown in column 110, row 134, a particular deviation request 52 may be labeled as "0001." Any suitable identifier may be used to identify each deviation request 52. Column 114 identifies a particular party that initiated the deviation request 52. For example, as shown in column 114, row 134, database 98 indicates that a particular group 30 (shown in FIG. 1) identified as "IT group" sent deviation request 52 referred to as "0001."

Column 118 identifies a relevant security rule and includes a description of the deviation from the identified security rule. The entries in column 118 are obtained from received deviation request 52. For example, as shown in column 118, row 134, a security rule referred to as "network access standard 3" is identified. In this example, "network access standard 3" is a security control standard directed to the safeguarding of network passwords used by employees of organization 10 to gain access to an internal computer network of organization 10. The description of the requested deviation from "network access standard 3" is also provided. As shown in column 118, row 134, the description generally states that request "0001" is a request to be exempt from the requirement to change network password every month, which is a requirement set forth in "network access standard 3," in this example.

Column 120 lists the status of each deviation request 52 identified in column 110. For example, column 120, row 134 shows that deviation request 52 identified as "0001" in column 110 is in "active" status, which indicates that the specific deviation described in column 118, row 134 has been approved and may be implemented by "IT group" identified in column 114, row 134. Column 128 lists any mitigating measures that may be associated with deviation request 52 referred to as "0001." Mitigating measures may be identified by party 80 and/or "IT group." For example, as indicated in column 128, row 134, deviation request 52 identified as "0001" in column 110, row 134 is "active" but the implementation of requested deviation requires the use of a proxy server. Column 130 lists a time period after which a review of the status indicated in column 120 may be reconsidered by party 80. For example, as indicated in column 130, row 134, deviation request 52 referred to as "0001" is reviewed annually by party 80.

As shown in column 118, both computer-based and non-computer-based security rules may be identified in deviation request 52. An example of a computer-based security rule is identified in column 118, row 140 as "application usage standard 1," and a deviation from "application usage standard 1" is requested in deviation request 52 referred to as "0003" listed in column 110, row 140. In this example, "application usage standard 1" is a security control standard directed to the usage of certain software applications, such as the INTERNET EXPLORER, NETSCAPE NAVIGATOR, MICROSOFT WORD, or any other software applications. An example of a non-computer-based security rule is identified in column 118, row 138 as "building access standard 1," and a deviation from "building access standard 1" is requested in deviation request 52 referred to as "0002" listed in column 110, row 138. In this example, "building access standard 1" is a security control standard directed to controlling the access to a particular physical area within the facility of organization 10 shown in FIG. 1.

FIG. 5 is a flowchart illustrating one embodiment of a method 150 for managing security in an organization, such as organization 10 shown in FIG. 1. Some or all acts of method 150 may be implemented using communication system 50 shown in FIG. 2 and security computer 70 shown in FIG. 3. However, any suitable device or combination of devices may be used in any organization to implement method 150. Organization 10, communication system 50, computer 70, and database 98 shown in FIGS. 1-4, respectively, are used as examples to describe some embodiments of method 150. However, the implementation of method 150 is not limited to the description provided below.

Method 150 starts at step 154. At step 158, a set of security rules is provided to business groups 30. At step 160, deviation requests 52 are sent from business groups 30 using computers 54, 58, and 60 through network 64. In one embodiment, each deviation request 52 is stamped with a time/date stamp and assigned an identifier. Each deviation request 52 also includes an identifier identifying a security rule, such as a security control standard, and a description of a deviation from the identified security rule. In one embodiment, deviation request 52 also includes a statement describing at least one benefit and/or reasoning associated with the requested deviation, and a mitigating measure for lowering the level of security risk associated with the proposed deviation. At step 164, deviation requests 64 are received at computer 70, which is accessible to security compliance party 80. In one embodiment, security compliance party 80 is the only entity associated with organization 10 that is designated to receive all deviation requests 52 generated by business groups 30, shown in FIG. 1. Thus, in such an embodiment, party 80 receives all deviation requests generated from within organization 10.

At step 168, party 80 decides whether each deviation request 52 is in fact non-compliant with a security policy or presents an unacceptable level of security risk. In one embodiment, party 80 is the only entity associated with organization 10 that is authorized by management party 14 to make a decision concerning each deviation request 52. Referring back to step 168, if no, then "no" branch is followed to step 170 where the information included in deviation request 52 and the status of the deviation request 52 are recorded in database 98 (shown in FIG. 4). For example, if a deviation request 52 in fact does not deviate from a security policy and does not present any risk to organization 10, then the request 52 is considered "closed" and recorded in database 98.

Referring back to step 168, if deviation request 52 is non-compliant or presents a level of security risk, then "yes" branch is followed to step 174. At step 174, the risk level associated with deviation request 52 is determined. The risk level may be determined using any suitable technique well known to one skilled in the art. At step 178, any benefit associated with the proposed deviation is determined. In one embodiment, the benefit is described in a statement that is included in deviation request 52; however, the benefit may also be unilaterally determined by party 80.

An example scenario is used to further describe some embodiments of steps 174 and 178. Business group 18 (shown in FIG. 1) may hire an outside contractor to update a portion of organization's 10 network over several months. Business group 18 may send deviation request 52 requesting an exemption from a security control standard that requires a change of a network password every month. The reasoning for the deviation included in deviation request 52 may be that implementing such a control standard may cause downtime due to unintended lock-out of the outside contractors from the network because of a contractor's failure to change the passwords every month, thus leading to downtime and an increased cost associated with the update process. At step 174, party 80 may determine from the reasoning provided in deviation request 52 that the benefit associated with the proposed deviation is that the network update for group 18 can be performed more quickly at a lower cost. At step 178, party 80 may determine that the risk associated with the proposed deviation is the increased likelihood that someone may access the network of organization 10 using an unchanged network password.

At step 180, security compliance party 80 decides whether to approve deviation request 52 based on the determined risk, benefit, and any other pertinent information, such as organization's security rules and any available measures that may lower the level of security risk associated with the proposed deviation. For example, referring again to the example scenario described above in conjunction with steps 174 and 178, party 80 may determine that in addition to the identified benefits and the risks, one may mitigate the level of risk by requiring a use of a proxy server that is placed between the portion of the network associated with group 18 and the rest of the network of organization 10. The implementation of such a mitigating measure isolates any security attack to the portion of the network associated with group 18, which lowers the risk associated with the proposed deviation. Such a mitigating measure may be included in deviation request 52 and/or identified by party 80.

In one embodiment, if the proposed deviation of deviation request 52 affects other entities within organization 10, then party 80 may consult the affected entity as a part of party's 80 decision-making process at step 180. In one embodiment, security compliance party 80 is the only entity in organization 10 that is authorized by management party 14 to make a decision at step 180. This is advantageous in some embodiments because the decisions regarding deviation from the security control standards of organization 10 are made by a single party, which increases the likelihood of consistent decision-making and simplifies the management of security within organization 10.

Referring again to step 180, if deviation request 52 is not approved, then the "no" branch is followed to step 184 where the status of deviation request 52 is communicated to business group 30 that sent the unapproved deviation request 52. Denied deviation request 52 at step 180 is assigned a status of "closed." Then method 150 proceeds to step 170 where information associated with the unapproved deviation request 52 and the associated status are recorded in database 98 shown in FIG. 4.

Referring back to step 180, if deviation request 52 is approved, then "yes" branch is followed to step 188 where the approval is communicated to the particular business group 30 that sent the approved deviation request 52. At step 190, if there is no mitigating measure to be implemented, then "no" branch is followed to step 170. If there is a mitigating measure to be implemented, then "yes" branch is followed to step 194 where the mitigating measure is implemented. In one embodiment, each deviation request 52 having an "active" status and designated to be reviewed after a predetermined period of time may be retrieved by computer 70 for a review of status by party 70. In such an embodiment, steps 168, 174, 178, 180, 184, 188, 190, 194, and 170 may be repeated for each deviation request 52 being reviewed. The length of the predetermined time period may vary depending on the security risk associated with each deviation request 52. In one embodiment, the predetermined period of time for review of deviation request 52 is shorter when the associated security risk is higher, as determined by party 80.

In one embodiment, the status of each active deviation request 52 recorded in database 98 shown in FIG. 4 may later be converted to the status of "closed" for a variety of reasons. For example, the particular security rule associated with an active deviation request 52 may change in a way that makes the deviation request no longer non-compliant. Because the active deviation request 52 is no longer a deviation, the active deviation request 52 is "closed." Other reasons for the change of "active" status to "closed" status include, but are not limited to, a change in situation where the security risk associated with an "active" deviation request 52 no longer exists, and where the situation that made the proposed deviation necessary no longer exists. Method 150 stops at step 198.

Figure 6:
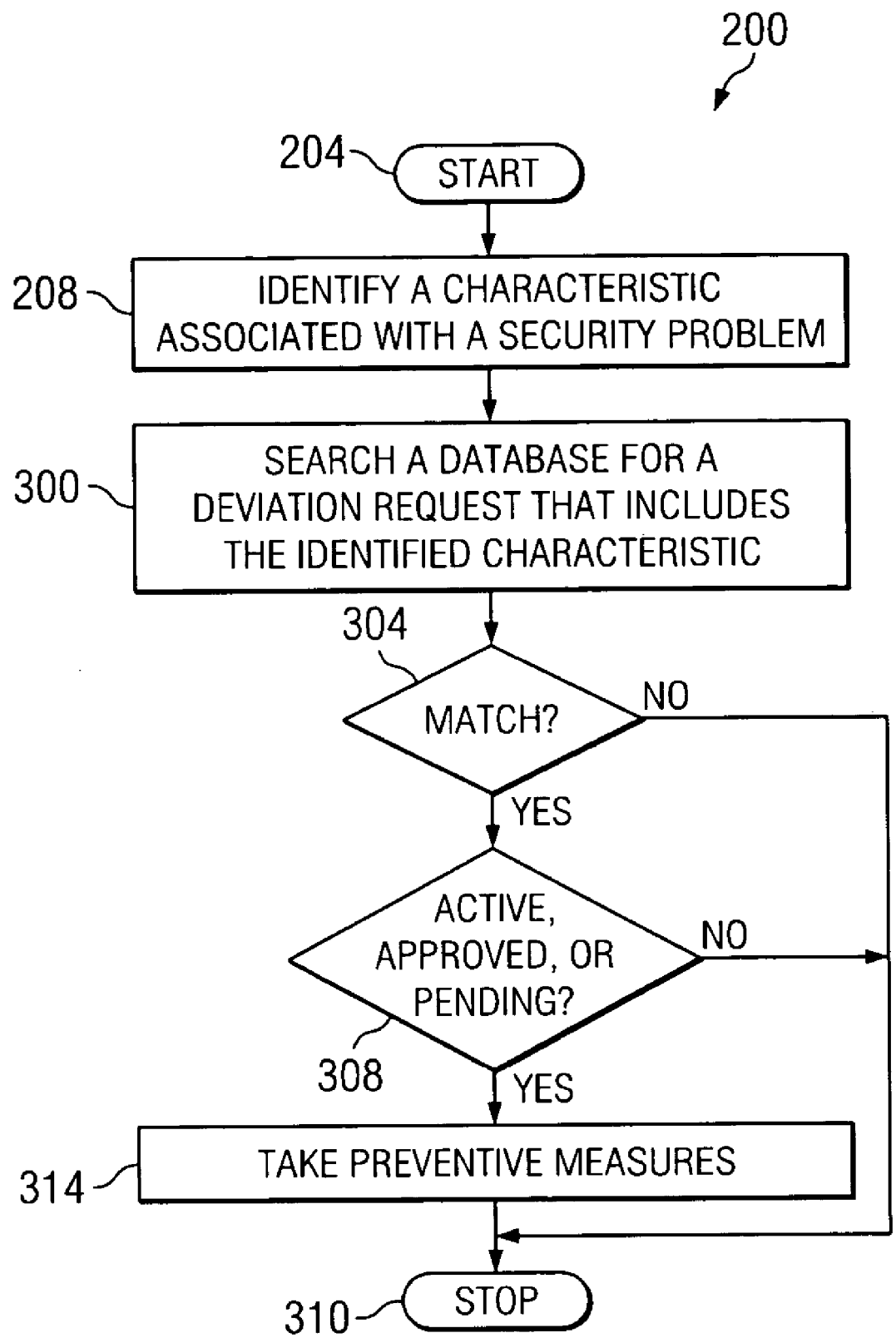
FIG. 6 is a flowchart illustrating one embodiment of a method for identifying a vulnerability to a security threat using the database shown in FIG. 4.

FIG. 6 is a flowchart illustrating one embodiment of a method 200 for identifying a vulnerability to a security threat by searching through database 98 shown in FIG. 4. Some or all acts of method 200 may be implemented using security computer 70 shown in FIG. 3. However, any suitable device or combination of devices may be used in any organization to implement method 200. Organization 10, computer 70, and database 98 shown in FIGS. 1, 3, and 4, respectively, are used as examples to describe some embodiments of method 200. However, the implementation of method 200 is not limited to the description provided below.

Method 200 starts at step 204. At step 208, a characteristic associated with a security threat is identified. For example, a security threat may be a rising rate of network password theft, where a stolen password is used to gain unauthorized access to a network. In this example scenario, at step 208, a characteristic of the security threat may be determined as "password-related" by party 80. At step 300, database 98 is searched using computer 70 for deviation request 52 that includes the identified characteristic. For example, party 80 may search for the word "password" in database 98. In some embodiments, multiple characteristics may be used to determine a match at step 304. For example, any entry having either the word "network" or the word "password" may be searched for at step 300.

At step 304, whether an entry in database 98 matches the characteristic of a security threat identified at step 208 is determined. If there is a match, then the "yes" branch is followed to step 308. If no, then "no" branch is followed to step 310. For example, where the word "password" is searched for at step 300, deviation request 52 identified as "0001" in column 110, row 134 of FIG. 4 is considered a match because the word "password" appears in column 118, row 134.

At step 308, using database 98, computer 70 determines whether matched deviation request 52 is active, pending, or closed. If matched deviation 52 is indicated as active in database 98, then the "yes" branch is followed to step 314 where security compliance party 80 takes preventive measures to reduce the risk exposure to the identified security threat. Examples of such measures include revoking the active status of the deviation proposed by the matched request 52. In another example, security compliance party 80 may require a more stringent mitigation measure so that business group 30 that requested the deviation may continue to benefit from implementing the deviation. Any other suitable preventive measures may be used at step 314. Referring back to step 308, if matched deviation request 52 is pending, then the decision on the pending deviation request 52 is considered in view of the identified security threat. If the matched deviation database 98 is indicated as "closed," then the "no" branch is followed to step 310. Method 200 stops at step 310.

Although some embodiments of the present invention have been described in detail, it should be understood that various changes, substitutions, and alterations can be made hereto without departing from the spirit and scope of the invention as defined by the appended claims.

What is claimed is:

1. A method for managing security, comprising:

communicating, to a plurality of business groups in an organization, a set of security standards applicable to the business groups, each business group assigned to conduct business in a particular business field and controlled by a management party managing the entire organization;

sending, from one or more computers, at least one deviation request from one or more of the business groups, wherein each deviation request comprises a proposed course of action that deviates from at least one of the security standards and also comprises a statement describing why the proposed course of action is beneficial for at least a part of the organization;

receiving all of the deviation requests at a computer accessible by a security compliance party having authority to approve or deny any one of the deviation requests;

for each deviation request received at the computer accessible by the security compliance party, determining, by the security compliance party, a benefit level associated with the proposed course of action to the organization based on the statement, said benefit level being determined by an analysis of positive consequences associated with implementing said deviation;

a risk level associated with the proposed course of action to the organization based on a comparison of the proposed course of action to the set of security standards, and also based on any available risk mitigation measures that mitigates the risk level, said risk level being determined by possible negative consequences associated with implementing said deviation; and deciding, by the security compliance party, whether to approve or deny the each deviation request for implementation based on the determined risk level and the determined benefit level.

2. The method of claim 1, wherein the computer is a first computer, and the proposed course of action does not comprise a setting of a second computer.

3. The method of claim 1, and further comprising:

storing all of the deviation requests in a database and an indication indicating whether each of the stored deviation requests is approved for implementation;

determining that a security threat associated with a deviation from the security procedures exists; and determining, by the security compliance party, that the organization is exposed to the security threat by matching the deviation with one of the stored deviation requests.

4. The method of claim 1, wherein each of the plurality of computers are coupled with the computer accessible from the central location through a computer network.

5. The method of claim 1, wherein determining a benefit level comprises determining a benefit level associated with the proposed course action based on the statement and at least one business requirement associated with the business group that sent the each deviation request.

6. The method of claim 1, and further comprising deciding, after a predetermined time period and by the security compliance party, that a previously approved deviation request is denied.

7. The method of claim 1, wherein if a particular deviation request is approved, a deviation to the set of security standards is implemented to alter the set of security standards.

8. The method of claim 1, wherein if a particular deviation request is approved, a deviation to the set of security standards is implemented to temporarily alter the set of security standards.

9. A method for managing security for an organization, comprising:

receiving a plurality of requests from a plurality of parties through a physical computing system, each request requesting permission to implement a deviation from an implemented security rule and including a statement describing a benefit associated with the deviation, wherein each deviation request comprises a proposed course of action that deviates from the implemented security rule;

whereas, prior to receiving the plurality of requests, communicating, to the plurality of parties in the organization, a set of security standards applicable to the parties, comprising at least one of the said security rule;

determining a risk level by analyzing possible negative consequences associated with the implementation of said deviation;

deciding whether to approve each request based on the determined risk and the statement;

storing the requests and a status of each request, the status indicating whether the request is approved, the stored requests including at least one approved request; and deciding, after a predetermined time period, whether to continue an approval of the approved request.

10. The method of claim 9, and further comprising determining a course of action that reduces the risk, and wherein deciding whether to approve each request comprises deciding whether to approve each request based on the statement, the risk, and the course of action that reduces the risk.

11. The method of claim 9, wherein the parties are within the organization and controlled by a management party, and wherein the acts of receiving, determining, and deciding are performed by a security committee that is the only entity within the organization authorized by the management party to decide whether to approve each request.

12. The method of claim 9, and wherein storing the requests comprises storing, in a database, the requests, a plurality of identifiers identifying the parties that sent the requests, and the decision corresponding to each request.

13. The method of claim 12, and further comprising:

identifying a characteristic of a potential security threat;

identifying, in at least one of the requests stored in the database, a string of one or more characters that indicates the characteristic;

identifying the party that sent the at least one of the requests; and reducing a level of exposure of the identified party to the security threat.

14. The method of claim 9, wherein the benefit is a business benefit for the party initiating the request.

15. The method of claim 9, wherein deciding, after a predetermined time period, whether to continue an approval of the approved request comprises deciding whether to continue the approval for another predetermined period of time.

16. The method of claim 9, wherein the plurality of requests includes at least one request requesting permission to implement a deviation from a non-computer-based security rule.

17. The method of claim 9, wherein the parties are business groups within the organization, each business group operable to conduct business in a different area, and the benefit is a business benefit.

18. The method of claim 9, wherein the parties are within the organization and controlled by a management party, and receiving the requests comprises receiving all requests generated within the organization at a security committee that is the only entity authorized by the management party to decide whether to approve each request.

19. A method for managing security for an organization, comprising:
providing a database identifying a plurality of deviations from one or more security rules, and a plurality of parties each implementing one or more of the deviations, each deviation comprising a course of action that deviates from an implemented security rule;
whereas, the one or more security rules are part of a set of security standards applicable to the parties of the said organization;
identifying a characteristic of a potential security threat;
determining that a string of one or more characters that indicates the characteristic is included in at least one of the plurality of deviations stored in the database;
identifying, from the database, at least one party implementing the at least one of the plurality of deviations; and
reducing a level of exposure of the identified party to the security threat;
wherein providing a database comprises:
receiving a plurality of requests from the plurality of parties, each request requesting permission to implement at least one of the deviations;
determining a benefit level and a risk level by analyzing possible consequences associated with the implementation of said deviation;
deciding whether to approve the request based on the determined benefit and the determined risk; and
storing in the database the requests, a plurality of identifiers identifying the parties that sent the requests, and for each request, an indicator indicating whether the each request is approved.

20. The method of claim 19, wherein reducing a level of exposure comprises revoking an authorization to implement the one or more deviations previously granted to the identified party.

21. The method of claim 19, wherein at least one of the deviations is a deviation from a non-computer-based security rule.

22. The method of claim 19, wherein at least one of the deviations is a deviation from a security rule directed to physical access to a facility.

23. The method of claim 19, wherein the database is provided by a security party within the organization having sole authority with the organization to allow the parties to implement the deviations.

24. The method of claim 19, wherein the plurality of requests comprises all requests generated within the organization.

25. A system for managing security for an organization, comprising:
a plurality of first computers operable to receive a plurality of requests from a plurality of parties and transmit the requests over a network, each request requesting permission to implement a deviation from an implemented security rule, each request comprising a proposed course of action that deviates from the implemented security rule and a statement describing why the proposed action is beneficial for at least a part of the organization; and
one or more second computers coupled to the plurality of first computers through the network, each second computer operable to receive the requests from the first computers, to present each received request to a party, to receive an input from the party indicating whether the each received request is approved, to store the each received request, the corresponding input in a database, and an identity of a party that initiated the each received request, and to present at least one of the requests that has been approved to the party after a predetermined period of time to allow the party to decide whether to continue the approval of the at least one requests;
whereas, the said security rules are part of a set of security standards applicable to the parties of the said organization.

26. The system of claim 25, wherein one of the second computers is further operable to:
receive a string of one or more characters that indicates a characteristic of a security threat;
determine that the string of one or more characters is included in at least one of the requests stored in the database; and
identify, from the database, at least one party implementing the at least one of the requests.

27. The system of claim 25, wherein the request includes a statement describing that the deviation is beneficial for at least a part of the organization.

28. The system of claim 25, wherein the input indicates that the each request is approved, and wherein one of the second computers is further operable present the approved request to the party after a predetermined time period previously specified by the party to allow the party to decide whether to continue the previous approval of the request.

29. The system of claim 25, wherein the plurality of requests includes at least one request requesting permission to implement a deviation from a non-computer-based security rule.

30. The system of claim 25, wherein the parties are business groups within the organization, each business group operable to conduct business in a different area.

31. A system for managing security for an organization, comprising:
a database stored in a computer-readable medium, the database identifying a plurality of deviations from one or more security rules, and a plurality of parties each implementing one or more of the deviations, each deviation comprising a course of action that deviates from an implemented security rule;
a program operable, when executed using a processor of a computing system having access to the database, to:
receive an input indicating a characteristic of a potential security threat to the organization;
determine that at least one deviation identified in the database includes the characteristic;
identify, from the database, at least one party implementing the at least one deviation; and
display the identified at least one party to a party;
whereas, the said one or more security rules are part of a set of security standards applicable to the parties of the said organization.

32. The system of claim 31, wherein at least one of the deviations is a deviation from a non-computer-based security rule.

33. The system of claim 31, wherein at least one of the deviations is a deviation from a security rule directed to physical access to a facility.

* * * * *